(12) United States Patent
Kato

(10) Patent No.: US 9,658,863 B2
(45) Date of Patent: May 23, 2017

(54) INFORMATION PROCESSING APPARATUS AND CONTROL METHOD THEREFOR

(71) Applicant: CANON KABUSHIKI KAISHA, Tokyo (JP)

(72) Inventor: Kensuke Kato, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 14/594,214

(22) Filed: Jan. 12, 2015

(65) Prior Publication Data

US 2015/0205619 A1 Jul. 23, 2015

(30) Foreign Application Priority Data

Jan. 20, 2014 (JP) ................................. 2014-008073
Dec. 9, 2014 (JP) ................................. 2014-249199

(51) Int. Cl.
*G06F 9/44* (2006.01)

(52) U.S. Cl.
CPC .......... *G06F 9/4418* (2013.01); *G06F 9/4411* (2013.01)

(58) Field of Classification Search
CPC .............................. G06F 9/4418; G06F 9/4411
See application file for complete search history.

(56) References Cited

U.S. PATENT DOCUMENTS

| | | | | |
|---|---|---|---|---|
| 5,748,971 A * | 5/1998 | Choi | ..................... | G06F 9/4418 710/260 |
| 7,519,808 B2 * | 4/2009 | Reece | .................... | G06F 1/3203 713/1 |
| 7,937,571 B2 * | 5/2011 | Hase | ..................... | G06F 9/4418 711/117 |
| 2002/0138669 A1 * | 9/2002 | Kadatch | ............... | G06F 1/3203 710/5 |
| 2005/0038933 A1 * | 2/2005 | Himmel | ................ | G06F 9/4418 710/15 |
| 2006/0212677 A1 * | 9/2006 | Fossum | ................ | G06F 1/3237 712/1 |
| 2009/0164771 A1 * | 6/2009 | Reece | .................... | G06F 1/3203 713/2 |
| 2010/0058045 A1 * | 3/2010 | Borras | ................ | G06F 9/44573 713/2 |
| 2013/0262898 A1 * | 10/2013 | Preston | ................ | G06F 9/4418 713/323 |

FOREIGN PATENT DOCUMENTS

JP 2009-301319 A 12/2009

* cited by examiner

*Primary Examiner* — Jaweed A Abbaszadeh
*Assistant Examiner* — Gary Collins
(74) *Attorney, Agent, or Firm* — Fitzpatrick, Cella, Harper & Scinto

(57) ABSTRACT

When generating a suspend request for a system running on an apparatus, data is stored to a non-volatile memory as a hibernation image which represents a memory state of a volatile memory, register values of a peripheral, and register values of a processor. When generating a boot request of the system, it is determined whether a valid hibernation image is available in the non-volatile memory. When the valid hibernation image is available, a boot core of the processor initializes a part of slave cores of the processor, and the boot core and/or the initialized slave core initialize the peripheral to perform a kernel initialization of the system. After the kernel initialization is completed, the memory state, and the register values of the peripheral and processor are restored based on the valid hibernation image.

13 Claims, 4 Drawing Sheets

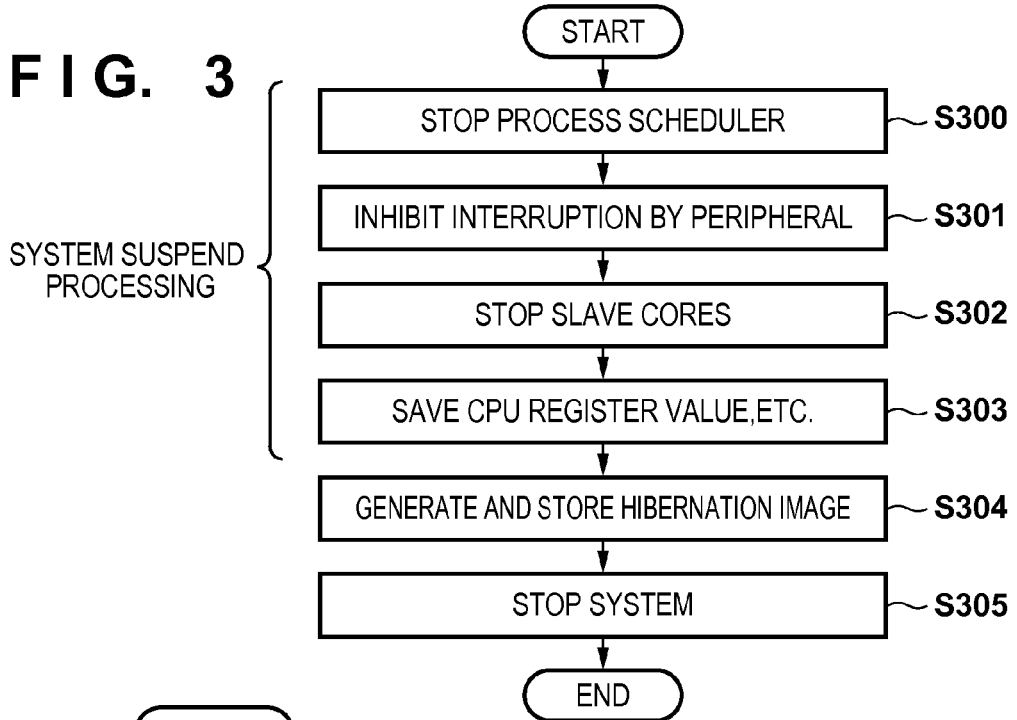
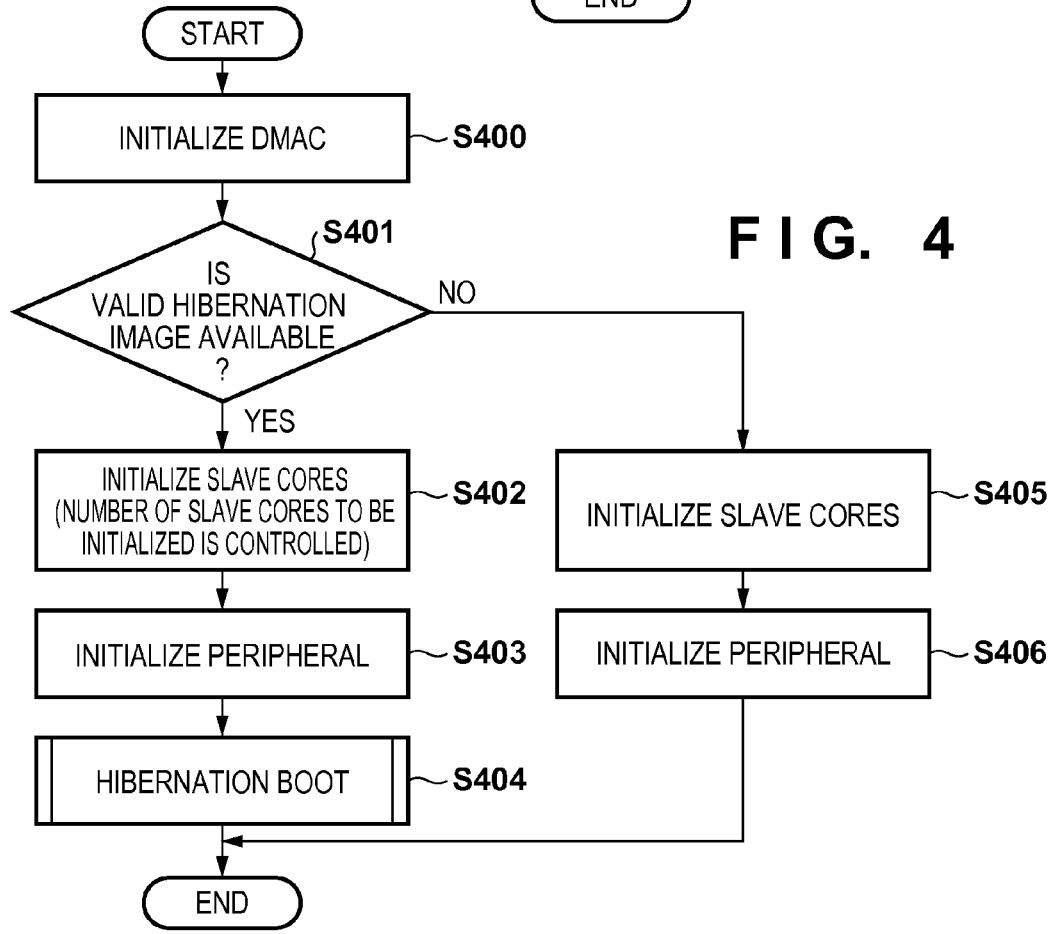

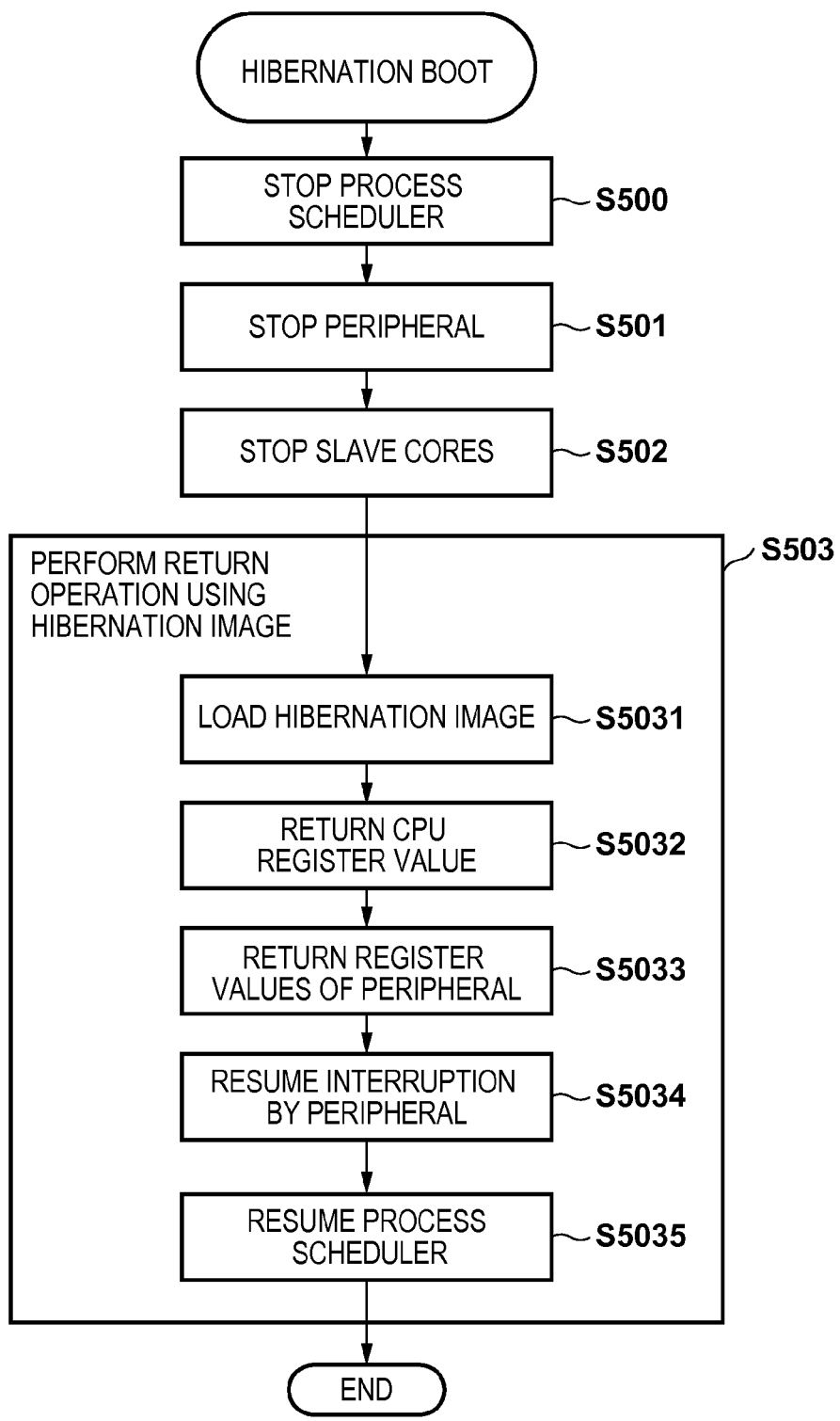

INFORMATION PROCESSING APPARATUS AND CONTROL METHOD THEREFOR

BACKGROUND OF THE INVENTION

Field of the Invention

The present invention relates to an information processing apparatus capable of performing hibernation, and a control method for the information processing apparatus.

Description of the Related Art

In recent years, hibernation which reduces the power consumption of an information processing apparatus in a standby state is attracting attention. Hibernation is a function for performing suspend-resume processing of a system. In a status in which the system of an information processing apparatus runs, for example, information stored in a memory, the register of a microprocessor, and a device such as a peripheral is saved in a non-volatile storage such as a hard disk. The saved information is called a "hibernation image". After saving the information, the information processing apparatus is powered off. When the information processing apparatus is powered on next time, the hibernation image saved in the non-volatile storage is loaded to return the information of the memory, register, and peripheral, thereby returning the system to the same status as that before the information processing apparatus is powered off. A boot of the system by hibernation will be referred to as a "hibernation boot" hereinafter. Hibernation may also be used for the purpose of shortening the start-up time of the system.

Hibernation boot methods are roughly classified into the following two kinds of methods. That is, the hibernation boot methods are classified into a method of performing a hibernation boot by a basic I/O system (BIOS) function or boot loader function, and a method of performing a hibernation boot by the kernel function of an operating system (OS).

In a hibernation boot by the kernel function, after kernel initialization, the status of the system before power-off is restored by loading the hibernation image stored in the non-volatile storage. A hibernation boot by the kernel function has versatility superior to a hibernation boot by the BIOS function since a peripheral is initialized by executing a normal boot sequence.

However, a hibernation boot by the kernel function requires the processing time to execute a boot sequence, thereby prolonging the start-up time, as compared with a hibernation boot by the BIOS function or boot loader function.

For recent information processing apparatuses, a multi-core system using a multicore processor formed from a plurality of cores or a multiprocessor system including a plurality of processors is used. In the multicore processor system, a core initialized by a BIOS or a unified extensible firmware interface (UEFI) will be referred to as a "boot core" hereinafter, and other cores will be referred to as "slave cores" hereinafter. There is proposed a method of attempting to shorten the start-up time by executing a program using the slave cores at the time of a system boot in the multicore processor system.

However, the boot method using the slave cores of the multicore processor system is limited in terms of the parallelism of an initialization unit when the number of cores becomes large to some extent, thereby limiting shortening of the start-up time. Furthermore, since it takes time to initialize the slave cores themselves, it becomes more difficult to shorten the start-up time as the number of cores increases.

SUMMARY OF THE INVENTION

In one aspect, an information processing apparatus which is capable of hibernation, comprising: a processor having a boot core and a plurality of slave cores; a volatile memory; a non-volatile memory; a holding control unit configured to store, in a case where a suspend request for a system running on the apparatus is generated, data to the non-volatile memory as a hibernation image which represents a memory state of the volatile memory, register values of at least one peripheral of the apparatus, and register values of the processor; and a return control unit configured to determine, in a case where a boot request of the system is generated, whether or not a valid hibernation image is available in the non-volatile memory, wherein, in a case where it is determined that the valid hibernation image is available, the boot core initializes a part of the plurality of slave cores, and the boot core and/or the initialized slave core initialize the at least one peripheral so as to perform a kernel initialization of the system, and wherein, after the kernel initialization is completed, the return control unit restores the memory state of the volatile memory, the register values of the at least one peripheral, and the register values of the processor based on the valid hibernation image.

According to the aspect, it is possible to perform a hibernation boot by the kernel function at high speed in an information processing apparatus comprising a multicore processor.

Further features of the present invention will become apparent from the following description of exemplary embodiments with reference to the attached drawings.

BRIEF DESCRIPTION OF THE DRAWINGS

FIG. 3 is a flowchart illustrating system suspend processing and hibernation image generation processing.

FIG. 4 is a flowchart illustrating kernel processing associated with a system return operation.

FIG. 5 is a flowchart illustrating hibernation boot processing.

DESCRIPTION OF THE EMBODIMENTS

The present invention will be described in detail below based on a preferred embodiment of the present invention with reference to the accompanying drawings. Note that arrangements shown in the following embodiment are merely examples, and the present invention is not limited to the illustrated arrangements.

[Apparatus Arrangement]

Figure 1:
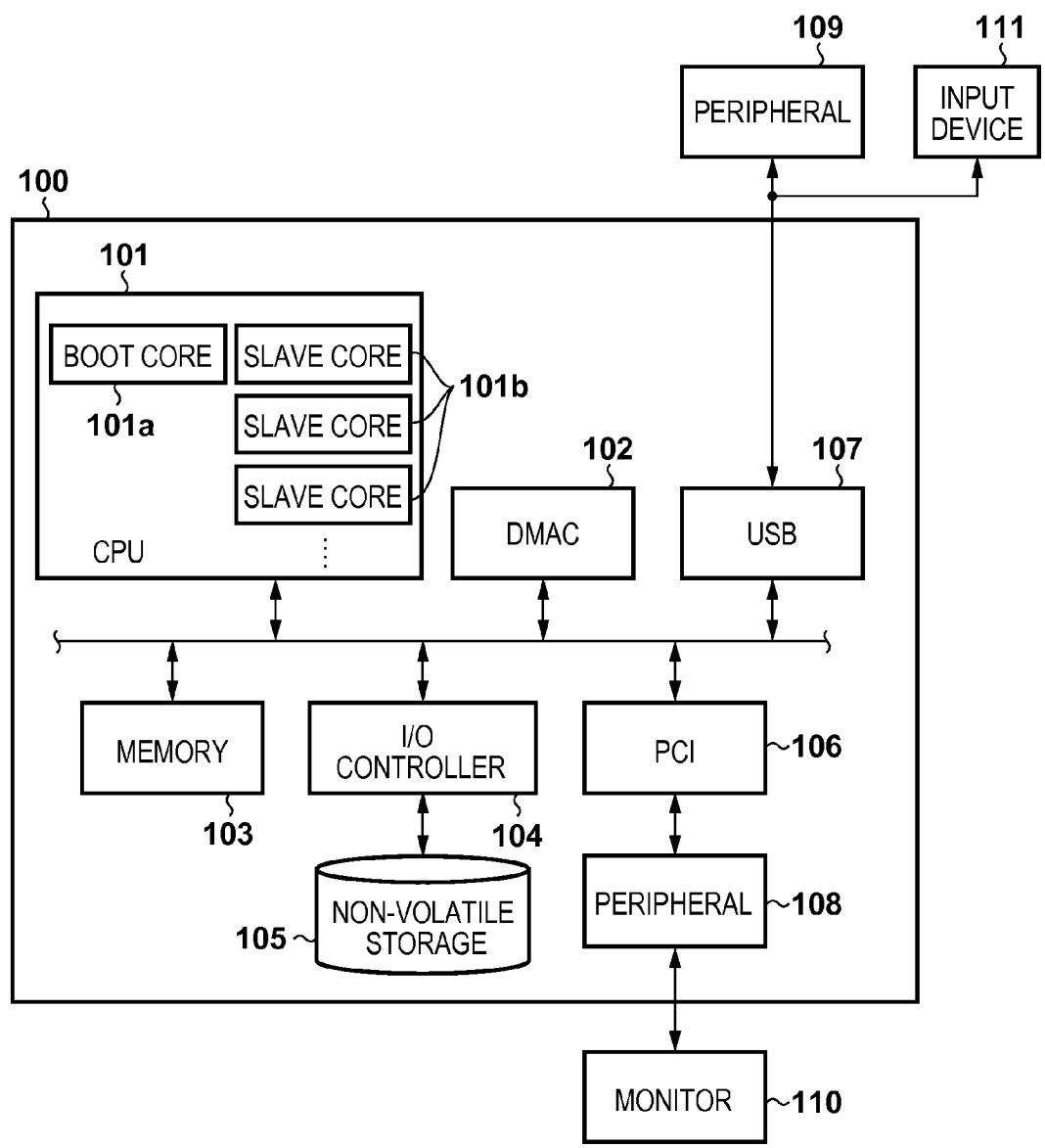
FIG. 1 is a block diagram showing the arrangement of an information processing apparatus according to an embodiment.

FIG. 1 shows the arrangement of an information processing apparatus 100 according to the embodiment. A microprocessor (CPU) 101 and a direct memory access controller (DMAC) 102 read/write data from/in a volatile memory 103 formed by a dynamic random access memory (DRAM). Note that an example of the DRAM forming the memory 103 is a double-data-rate synchronous dynamic random access memory (DDR SDRAM). Also, the DMAC 102 can access the memory 103, a non-volatile storage 105, the registers of peripherals 108 and 109, and the like by direct memory access.

An input/output (I/O) controller 104 reads/writes data from/in the non-volatile storage 105 as a non-volatile memory such as a flash memory, hard disk drive (HDD), or solid-state drive (SSD) through an interface such as a serial ATA based on a request of the CPU 101 or DMAC 102.

The information processing apparatus 100 can use the peripheral 108 which may be a graphic accelerator card connected through a peripheral component interconnect (PCI) bus 106, and the peripheral 109 which may be a scanner or printer connected through a universal serial bus (USB) 107. These peripherals 108 and 109 are initialized by the CPU 101, and each include a status register for holding the status of itself, and a configuration register for holding values (processing parameters and a value indicating a processing mode) used for processing. The number of peripherals is not limited to two, and may be one or three or more, as a matter of course.

A monitor 110 is connected to the peripheral 108 which may be a graphic accelerator card, the CPU 101 displays a user interface (UI) or the like on the monitor 110. An input device 111 such as a keyboard or pointing device is connected to the USB 107, and various user instructions are input to the CPU 101 through the input device 111. Note that the information processing apparatus 100 may be implemented as a tablet device or smartphone including a touch panel formed by stacking the monitor 110 and the input device 111.

The CPU 101 loads program codes stored in the non-volatile storage 105 to the memory 103, and fetches the program codes from the memory 103, thereby executing processing (to be described later). The CPU 101 is a multicore processor including a plurality of processor cores, and the kernel of the system running on the information processing apparatus 100 is initialized by mainly using a specific processor core (boot core) 101a initialized by the BIOS or UEFI. Processor cores except for the boot core 101a serve as slave cores 101b.

[Hibernation]

The information processing apparatus 100 of this embodiment has a hibernation function. As described above, hibernation is a technique of storing a system state at the time of execution of the system running on the information processing apparatus 100 before the information processing apparatus 100 is powered off, and restoring the stored system state when the information processing apparatus 100 is powered on next time. Data indicating the stored/restored system state is a hibernation image. Note that the hibernation image is stored in the non-volatile storage 105.

The procedure of general hibernation processing in the information processing apparatus 100 shown in FIG. 1 will now be described. When the user issues a system suspend request through the input device 111 or the like, or a user application issues a system suspend request, hibernation processing starts.

Upon start of hibernation processing, the CPU 101 generates a hibernation image based on data written in the memory 103, data in the status registers and configuration registers (to be simply referred to as the "registers" hereinafter) of the peripherals, and the register value of the CPU 101, and stores the hibernation image in the non-volatile storage 105. After the information processing apparatus 100 is powered off, and then powered on again, kernel initialization of the system starts. Immediately after kernel initialization, the hibernation image is loaded from the non-volatile storage 105 to the memory 103 to execute hibernation processing of returning the data in the memory 103, the data in the registers of the peripherals, and the register value of the CPU 101 to those in a status immediately before the system is suspended.

Figure 2:
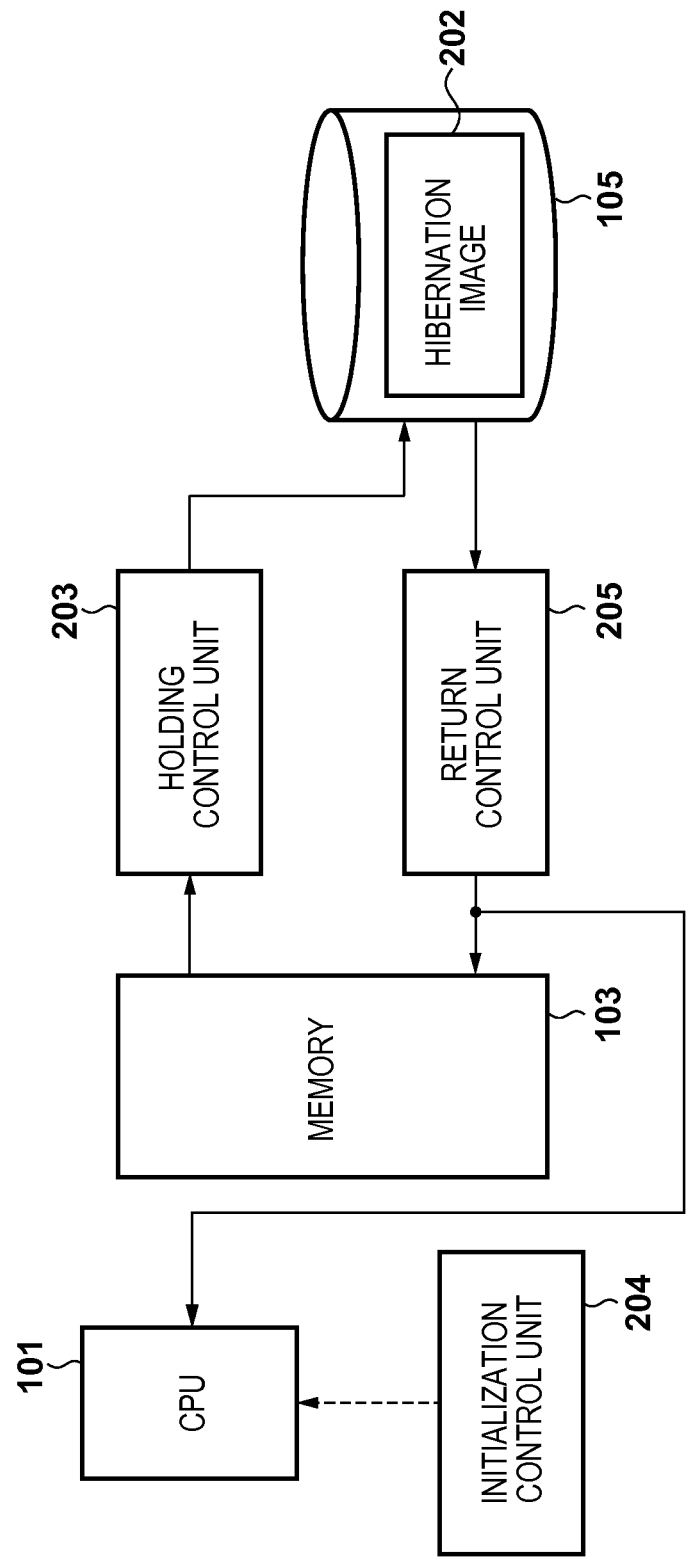
FIG. 2 is a block diagram showing the arrangement of a hibernation function.

FIG. 2 is a block diagram showing the arrangement of the hibernation function of the information processing apparatus 100 according to this embodiment, and shows a functional arrangement implemented by the kernel function when a suspend request is generated and the information processing apparatus 100 is powered on.

A holding control unit 203 stores a hibernation image 202 generated based on a system suspend request in the non-volatile storage 105. At the time of a hibernation boot, an initialization control unit 204 controls the number of cores to be initialized among the slave cores 101b of the CPU 101. At the time of the hibernation boot, a return control unit 205 loads the hibernation image 202 stored in the non-volatile storage 105 to the memory 103. The return control unit 205 restores the memory state (to be referred to as a "CPU register value" hereinafter) of a CPU register based on the hibernation image 202 loaded to the memory 103.

Note that the holding control unit 203, the initialization control unit 204, and the return control unit 205 are implemented when the boot core 101a of the CPU 101 executes the kernel as part of the OS stored in the non-volatile storage 105.

Generation of Hibernation Image

System suspend processing and hibernation image generation processing according to this embodiment will be described with reference to FIG. 3. FIG. 3 is a flowchart illustrating processing by the CPU 101 until the system stops after the user (or user application) issues a system suspend request.

Upon detecting the system suspend request based on a user instruction of a power-off operation or the like, the CPU 101 stops a process scheduler (S300), inhibits interruption by the peripheral, and saves data (to be referred to as "register values" hereinafter) indicating the memory states of the registers of the peripheral in the memory 103 (S301). The boot core 101a of the CPU 101 stops the slave cores 101b of the CPU 101 (S302), and saves the CPU register value in the memory 103 (S303). With this processing, a hibernation image is generated in the memory 103, and stored in the non-volatile storage 105 (S304). After that, the system is stopped (S305). Note that the holding control unit 203 stores the generated hibernation image in the non-volatile storage 105 through the DMAC 102 and the I/O controller 104.

The processes in steps S300 to S303 will be referred to as "system suspend processing". The system suspend processing will be described in more detail.

After the CPU 101 stops all processes (S300), no memory contents are changed by the processes. The CPU 101 stores the register values of the peripheral in the memory 103, and then disables access by the peripheral (S301). The boot core 101a of the CPU 101 stops all the slave cores 101b of the CPU 101 (S302), and stores the CPU register value in the memory 103 (S303).

After the system suspend processing, the holding control unit 203 saves, in the non-volatile storage 105, the hibernation image indicating the system state held in the memory 103 before the system is suspended (S304). Note that the header portion of the hibernation image includes, for example, identification information indicating whether the hibernation image is valid. When, for example, there is no sufficient space to store the hibernation image in the non-volatile storage 105, the hibernation image having undergone data compression may be saved in the non-volatile storage 105. It is possible to determine, based on the identification information, whether the hibernation image has undergone data compression, as a matter of course.

As described above, in the system suspend processing, all pieces of information indicating the system state are stored in the memory 103. The holding control unit 203 stores data indicating the memory state of the memory 103 as a hibernation image in the non-volatile storage 105, and the return control unit 205 loads the data to the memory 103, as needed. The return control unit 205 can restore the CPU register value to resume the slave cores 101b, and restore the register values of the peripheral to resume interruption by the peripheral and the process scheduler, thereby returning the system.

Hibernation Boot by Kernel Function

Upon detecting a system boot request based on a user instruction of a power-on operation or the like, the information processing apparatus 100 enters a system boot state, and the boot core 101a executes the BIOS (or UEFI) and, as needed, the processing of the boot loader, thereby starting kernel initialization.

Hibernation boot processing by the kernel function according to this embodiment, that is, processing from the start of kernel initialization to a system return operation will be explained below with reference to a flowchart shown in FIG. 4. FIG. 4 is a flowchart illustrating the kernel processing by the boot core 101a for the system return operation.

The kernel initializes the DMAC 102 (S400), loads the header portions of hibernation images from the non-volatile storage 105 through the DMAC 102, and determines whether a valid hibernation image is available in accordance with whether a valid hibernation image is stored in the non-volatile storage 105 (S401). Note that based on identification information included in the header portion of the hibernation image, it is determined whether the hibernation image is valid. The determination processing in step S401 corresponds to the processing of the return control unit 205.

If a valid hibernation image is available, the kernel initializes some of the slave cores 101b (S402), and initializes a peripheral (S403), thereby completing kernel initialization. The initialization control unit 204 controls the number of slave cores 101b to be initialized in step S402. If one peripheral is to be initialized, the boot core 101a or at least one initialized slave core 101b initializes the peripheral. On the other hand, if a plurality of peripherals are to be initialized, the boot core 101a and at least one initialized slave core 101b, or the plurality of initialized slave cores 101b initialize the peripherals.

Subsequently, a hibernation boot is performed (S404), and a detailed description thereof will be given later. As described above, if it is determined that a valid hibernation image is available, kernel initialization and a hibernation boot are performed in steps S402 to S404.

On the other hand, if it is determined that no valid hibernation image is available, a normal system boot (kernel initialization) different from a hibernation boot is performed in steps S405 and S406. That is, the kernel initializes all the slave cores 101b without limiting the number of slave cores by the initialization control unit 204 (S405), and initializes a peripheral (S406).

In the processing shown in FIG. 4, when performing a hibernation boot, the peripheral is initialized (S403) before the hibernation boot, and it is thus difficult to acquire a hibernation image previously stored in the non-volatile storage 105. Therefore, only the DMAC 102 is initialized in advance (S400), and the pieces of identification information of hibernation images stored in the non-volatile storage 105 are acquired to determine whether a valid hibernation image is available (S401).

When initializing the slave cores 101b (S402), limiting the number of slave cores 101b to be initialized to a small number shortens the time taken for initialization. To the contrary, as the number of slave cores 101b to be initialized in step S402 decreases, the parallelism of initialization deteriorates when initializing the plurality of peripherals in step S403, and thus the time taken for initialization increases. Consequently, it is preferable to set the number of slave cores 101b to be initialized in accordance with the number of peripherals to be initialized, and the initialization control unit 204 sets the number of slave cores 101b to be initialized in accordance with, for example, a previous instruction input by the user (or user application). Note that if initialization of all the slave cores 101b is inhibited, no initialization of the slave cores 101b is performed (S402), and the boot core 101a initializes the peripheral (S403).

FIG. 5 is a flowchart illustrating details of the hibernation boot processing (S404).

The kernel stops the process scheduler (S500), stops the peripheral (S501), and stops the slave cores 101b initialized in step S402 (S502). Then, a system return operation is performed using the hibernation image (step S503), as follows.

That is, the kernel causes the DMAC 102 to load the hibernation image stored in the non-volatile storage 105 to the memory 103, and returns the memory state of the memory 103 to the same memory state as that immediately after the slave cores 101b are stopped in step S302 shown in FIG. 3 (S5031). After that, the kernel returns the CPU register value based on the memory state of the memory 103 (S5032), and returns the register values of the peripheral (S5033). The processes in steps S5031 to S5033 correspond to the processing of the return control unit 205. Subsequently, the kernel resumes interruption by the peripheral (S5034), and resumes the process scheduler (S5035), thereby completing the hibernation boot.

With this processing, after the memory state of the memory 103 and the CPU register value are returned, it is possible to use the slave cores 101b which have not been initialized in step S402 due to the limitation of the number of slave cores at the time of a hibernation boot but were initialized when generating the hibernation image.

As described above, it is possible to return the system at high speed, as compared with the conventional hibernation boot, by limiting, before a hibernation boot is performed, the number of slave cores 101b to be initialized.

Modification of Embodiment

During kernel initialization, the return control unit 205 can load a hibernation image to the memory 103. In other words, kernel initialization and an operation of loading a hibernation image can be performed in parallel. That is, the boot core 101a can cause the initialized slave cores 101b to initialize the peripheral (S403), and load the hibernation image by an operation as the return control unit 205 (S5031).

Furthermore, if the hibernation image has undergone data compression, decompression processing can also be performed at the same time. For example, if the identification information of the hibernation image indicates data compression, the initialization control unit 204 sets the number of slave cores 101b to be initialized in consideration of the number of slave cores 101b necessary for decompressing the hibernation image. The boot core 101a initializes the slave cores 101b, the number of which has been set by the initialization control unit 204 (S402). Also, the boot core 101a causes the initialized slave cores 101b to decompress the hibernation image in parallel with initialization of the peripheral (S403) by an operation as the return control unit 205.

Although a case in which the CPU 101 of the information processing apparatus 100 is in the form of the multicore processor including the boot core 101a and the plurality of slave cores 101b has been explained, the present invention is equally applicable to a case in which a multiprocessor system including a plurality of CPUs runs. That is, it is only necessary to apply the above processing by regarding the plurality of processors as a boot processor and slave processors respectively corresponding to the boot core and the slave cores in the aforementioned embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-008073 filed Jan. 20, 2014 and 2014-249199 filed Dec. 9, 2014 which are hereby incorporated by reference herein in their entirety.

What is claimed is:

1. An information processing apparatus which is capable of hibernation, comprising:
   a processor having a boot core and a plurality of slave cores;
   a volatile memory;
   a non-volatile memory;
   a holding control unit configured to store, in a case where a suspend request for a system running on the apparatus is generated, data to the non-volatile memory as a hibernation image which represents a memory state of the volatile memory, register values of at least one peripheral of the apparatus, and register values of the processor; and
   a return control unit configured to determine, in a case where a boot request of the system is generated, whether or not a valid hibernation image is available in the non-volatile memory,
   wherein, in a case where it is determined that the valid hibernation image is available, the boot core initializes a part of the plurality of slave cores according to a number of peripherals of the apparatus, and the boot core and/or the initialized slave core initialize the at least one peripheral so as to perform a kernel initialization of the system, and
   wherein, after the kernel initialization is completed, the return control unit restores the memory state of the volatile memory, the register values of the at least one peripheral, and the register values of the processor based on the valid hibernation image.

2. The apparatus according to claim 1, wherein, in a case where it is determined that no valid hibernation image is available, the boot core initializes the plurality of slave cores, and the boot core and/or the initialized slave cores initialize the at least one peripheral so as to perform the kernel initialization.

3. The apparatus according to claim 1, wherein, based on the valid hibernation image, the return control unit restores the memory state of the volatile memory to a memory state before the slave cores are stopped in response to the suspend request, restores the register values of the at least one peripheral to register values before the stopping of the slave cores, and restores the register values of the processor to register values before the stopping of the slave cores.

4. The apparatus according to claim 1, further comprising an initialization control unit configured to control a number of the slave cores to be initialized by the boot core.

5. The apparatus according to claim 4, further comprising an input unit configured to input a user instruction indicating the number of the slave cores to be initialized,
   wherein the initialization control unit controls the boot core so that the number of the slave cores indicated by the user instruction is initialized.

6. The apparatus according to claim 1, wherein the hibernation image contains identification information indicating whether the hibernation image is valid or not, and the return control unit reads out the identification information of the hibernation image from the non-volatile memory to perform the determination based on the identification information.

7. The apparatus according to claim 6, further comprising a direct memory access controller configured to access the volatile memory and the non-volatile memory,
   wherein the boot core initializes the direct memory access controller before the determination by the return control unit.

8. The apparatus according to claim 7, wherein the return control unit accesses the identification information through the direct memory access controller to perform the determination.

9. The apparatus according to claim 4, wherein the return control unit be able to load the valid hibernation image into the volatile memory in parallel to the kernel initialization.

10. The apparatus according to claim 9, wherein, in a case where the hibernation image loaded into the volatile memory is data compressed, the initialization control unit sets a number of the slave cores necessary to decompress the compressed hibernation image and initialize the at least one peripheral as the number of the slave cores to be initialized.

11. The apparatus according to claim 10, wherein the return control unit controls the initialized slave cores to perform decompression of the compressed hibernation image in parallel to the initialization of the at least one peripheral.

12. The apparatus according to claim 1, wherein, in the case where the suspend request for the system is generated, the boot core stores the register values of the at least one peripheral and the register values of the processer to the volatile memory, and then the holding control unit stores data, which represents the memory state of the volatile memory, to the non-volatile memory as the hibernation image.

13. A method of control an information processing apparatus which is capable of hibernation and comprises a processor having a boot core and a plurality of slave cores, a volatile memory, and a non-volatile memory, the method comprising:

using the boot core to perform steps of:

storing, in a case where a suspend request for a system running on the apparatus is generated, data to the non-volatile memory as a hibernation image which represents a memory state of the volatile memory, register values of at least one peripheral of the apparatus, and register values of the processor; and determining, in a case where a boot request of the system is generated, whether or not a valid hibernation image is available in the non-volatile memory, wherein, in a case where it is determined that the valid hibernation image is available, the boot core initializes a part of the plurality of slave cores according to a number of peripherals of the apparatus, and the boot core and/or the initialized slave core initialize the at least one peripheral so as to perform a kernel initialization of the system, and wherein, after the kernel initialization is completed, the memory state of the volatile memory, the register values of the at least one peripheral, and the register values of the processor are restored based on the valid hibernation image.

* * * * *